United States Patent [19]

Bertrand et al.

[11] Patent Number: 5,085,516
[45] Date of Patent: Feb. 4, 1992

[54] PROCESS FOR DETERMINING AND MONITORING THE SHAPE OF THE EDGES OF A CURVED OBJECT AND APPARATUS THEREFOR

[75] Inventors: Gérard Bertrand, Clamart; Gérard Imbert, Le Plessis-Robinson; Gabriel Narduzzo, Mons-en-Bareuil, all of France

[73] Assignee: Societe Generale pour les Techniques Nouvelles SGN, France

[21] Appl. No.: 409,710

[22] Filed: Sep. 20, 1989

[30] Foreign Application Priority Data

Sep. 23, 1988 [FR] France ............................ 88 12489

[51] Int. Cl.$^5$ .............................................. G01B 11/00
[52] U.S. Cl. ..................................... 356/394; 356/239; 356/376
[58] Field of Search ............... 356/237, 239, 128, 376, 356/388, 390, 398, 394, 2; 250/563

[56] References Cited

U.S. PATENT DOCUMENTS

| | | | |
|---|---|---|---|
| 3,985,454 | 10/1976 | Fletcher et al. | 356/239 |
| 4,446,481 | 5/1984 | Edamatsu et al. | 358/106 |
| 4,492,477 | 1/1985 | Leser | 356/430 |
| 4,647,197 | 3/1987 | Kitaya et al. | 356/239 |
| 4,701,047 | 10/1987 | Eibert et al. | 356/1 |
| 4,847,510 | 7/1989 | Douglas | 356/394 |

OTHER PUBLICATIONS

Optical Engineering, vol. 18, No. 1, Janvier/Febrier 1979 pp. 63-66; G. Indebetouw: "A Simple Optical Noncontact Profilometer".

Primary Examiner—Richard A. Rosenberger
Assistant Examiner—Hoa Pham
Attorney, Agent, or Firm—Brumbaugh, Graves, Donohue & Raymond

[57] ABSTRACT

The process involves comparing the shape of the edges of a curved object being monitored with that of a standard curved object. A reference is obtained by tracing an orthogonal projection of the standard curved object on a plane. The monitored object is placed face-to-face with the reference and the edges of both the reference and the monitored object are illuminated by a fan beam produced by a laser. The required measurements are performed on the basis of the thus-generated traces and the use of guide marks. The present invention also discloses an apparatus for carrying out the above process. A typical application of the invention is in the monitoring of window panels in the automobile industry.

8 Claims, 3 Drawing Sheets

PROCESS FOR DETERMINING AND MONITORING THE SHAPE OF THE EDGES OF A CURVED OBJECT AND APPARATUS THEREFOR

BACKGROUND OF THE INVENTION

The present invention relates to a process for determining and monitoring the shape of the edges of a curved. More particularly, the present invention relates to a process for determining the shape of the edges of a curved object and monitoring the latter by comparison with the shape of a standard curved object.

The invention also relates to an apparatus for carrying out the above process.

Frequent use is made, e.g. in the automobile industry, of objects having a generally curved shape. The edges of such objects have a generally complex shape.

And yet it is usually required that the edges of such objects fit exactly on a support, e.g. a metal support having a well-defined shape, so that the object and its support can be assembled simply by gluing. This is particularly true of automobile window sections: windshield and side and rear windows. There is thus a need for a process and apparatus for determining the shape of a curved object in view subsequently comparing the thus-determined shape with a standard shape defined in the specifications.

It will be noted the apparatus carrying out the process should be capable of being readily incorporated in an industrial production line for curved objects and should consequently be able to determine the said shape in a very short space of time, which in practice is on the order of a few seconds.

SUMMARY OF THE INVENTION

According to the invention, there is provided a method comprising the steps of:

forming an orthogonal projection of the standard curved object on a plane, the formed projection constituting the reference to which monitored objects will be compared, and providing guide marks in a region of the reference's perimeter;

positioning said monitored object face-to-face with said reference;

illuminating the edges of said monitored object and the edges of said reference with a fan beam generated by a laser and so generating traces of said beam on said edges, said fan beam being in a plane orthogonal to the plane of said reference and containing the normal of the edge of said monitored object;

recording said traces and traces of at least one guide mark by means of a camera fixedly positioned with respect to said laser and having a focal axis subtending a known constant angle with the plane of said fan beam generated by said laser, said fixed system formed by said laser and said camera being displaced around said monitored object for performing a series of recordings;

calculating on the basis of said recordings on the one hand the spacing between said monitored object and said reference in the plane of said fan beam and on the other hand the distance between the edges of said monitored object and said edges of said reference in the plane of said reference and comparing said spacing and said distance values, after correcting for a trimming operation, with data relative to said standard curved object.

The process according to the invention thus involves determining at a plurality of points the position of the edge of the curved object with respect to the edge of a reference. To that end, there is first produced a reference and the monitored objects are subsequently passed along face-to-face with the reference.

In the present context, the term "reference" signifies that which is produced by an orthogonal projection on a plane of the edges of the standard curved object, the latter being accurately positioned (in elevation and along the plane) with respect to the projection plane, the said position being henceforth termed reference position.

The shape of the standard curved object conforms with the design specifications.

The reference can be formed by cutting out a volume, e.g. a metal plate along the trace of the orthogonal projection. According to this embodiment of the invention, the guide marks are advantageously located in the thickness of the said reference.

According to an alternative embodiment of the invention, the said reference can be obtained by forming the trace of the orthogonal projection of the edges of the standard curved object on a two-dimensional support, e.g. by a line. The reference is in this case a surface on which appears the said trace. A photographic film can be used for that purpose. Other types of media can be used, including those used in connection with serigraphic processes. Guide marks are provided on the medium in proximity to the said trace so that when the camera locates the guide marks, it records their trace with the traces of the fan beam on the edges of the reference and the monitored object. These guide marks are positioned such that they will serve to indicate the point of measurement with respect to a known arbitrary origin, associated with the reference and object. Any guide marks can be used.

In the case of a reference having a certain amount of thickness, the guide marks can e.g. consist of lights, or lines along the thickness of the reference.

In the case of a reference in the form of a two-dimensional medium, e.g. a photographic film, the guide marks can consist of lines or irradiated dots that are suitably placed on the medium with respect to line thereon defining the orthogonal projection of the edges of the standard shape.

Once the orthogonal projection of the standard object, i.e. the reference, is formed, the monitored object is positioned with respect to the reference.

Positioning is the operation in which the monitored object is brought onto and held at the reference position, or close thereto, using known means, such as suction pads and/or spacers face-to-face with the reference.

Advantageously, the monitored object is brought to the position where the standard curved object was placed for obtaining the reference (henceforth termed "reference position"). This position cannot be ascertained in practice, and the resulting positional difference is accounted for in subsequent calculations (in the trimming operations).

It shall be emphasized that the monitored object and the reference do not contact each other during the course of the process according to the invention.

The monitored object is to be positioned in face-to-face relationship with the reference, and is generally above the latter.

The assembly formed by the reference and the monitored object—or rather its edges—are illuminated by a fan beam generated by a laser. The fan beam is orthogonal to the plane of reference and contains the normal from the edge of the monitored object, and consequently generates two traces: one on the edges of the reference, the other on the edges of the monitored object. It is advantageous to use, a luminous source to illuminate at least one of the guide marks associated with said reference to facilitate recordation of the guide mark trace by the camera.

The cooperating camera records (picks up and transmits to a data processor) the above traces and the trace associated with the guide mark, thereby carrying out the measurement.

The camera and laser are joined by an assembly that revolves around an assembly comprising the reference and monitored object to perform a series of measurements.

In an advantageous embodiment implementing data processing means, calculations are performed on the basis of the measurements. The parameters to be determined include the spacing between the monitored object and the reference, in the plane of the fan beam, and the distance—in the plane of the reference—between the edges of said object and said reference.

After corrections of trimming operations, the determined values are compared with the data relative to the standard curved shape.

The reference used in the process according to the invention can be either in a horizontal plane or in an inclined plane. According to a preferred embodiment, the reference is in a plane inclined approximately 70° with the horizontal. The idea in this case is to approach the curved object's conditions of use (e.g. position of automobile glass panels).

It has been shown that the monitored object is advantageously located above the reference.

When the reference has a certain thickness within which are advantageously contained the guide marks, the fan beam is advantageously perpendicular to the thickness of the reference.

When the reference consists of a surface bearing the trace of the standard object's orthogonal projection, as well as the guide marks, the axis of the fan beam is advantageously inclined with respect to that surface. The degree of inclination is to be optimized to obtain exploitable traces.

The latter variant of the invention can be implemented using as reference a photographic film or any other two-dimensional medium bearing a line, or perimeter (trace of the standard object's orthogonal projection) whose color is in the spectral region of the laser's emission wavelength. The film or medium also bears detectable marks in proximity to said line.

Advantageously, the medium is black for maximum absorption of the light rays and minimum reflection. This explains why photographic film constitutes a preferred embodiment of the invention.

A particular preferred embodiment would be the use of a black photographic film bearing a red perimeter in proximity to which white guide marks (for good contrast), illuminated by a He-Ne laser.

As an alternative to photographic film, any suitable medium can be used in which the orthogonal projection trace is printed e.g. by serigraphy.

The process according to the invention, which involves the use of lasers, can be combined with other techniques, such as ultrasonic methods to carry out measurements at points of the monitored object that are not located on the edges.

In another aspect, the present invention relates to an apparatus for carrying out the above process. Such an apparatus is comprised of; means for fixing together said reference and said monitored object, means for supporting an assembly formed by said reference and said monitored object, an assembly unifying said laser and said camera, said assembly being rotatable around said assembly formed by said reference and said monitored object, and means for recording said generated traces.

In another apparatus, the results of the measurements carried out i.e., the spacing in the plane of the fan beam between the monitored object and the reference and the distance in the plane of the reference between the edges of the monitored object and the edges of the reference, are compared with the corresponding results for the standard curved object. The result of this comparision forms the basis for deciding whether or not the curved object under test is acceptable for its intended use obviously, this decision is dependent upon the deviations from the standard curved object that are acceptable in the intended use.

The apparatus according to the invention is perfectly well suited for use in an industrial environment of monitoring curved objects coming out of a production line. For this reason, the apparatus is advantgeously equipped with devices for its integration into a production line. The devices comprise a turret having four work-stations. The first work-station receives the curved object, brought in by a conveyor on a support having a hollow central portion for passage of a suction pad. The second work-station positions the curved object with respect to the references. The third work-station carries out the process according to the invention. The fourth work-station receives and unloads the curved object on a new conveyor line.

The different work-stations can be designed such that the curved objects therein adopt a position that is identical, or nearly identical (e.g. placed horizontally, vertically, or inclined by a certain angle) to that which they will occupy in use.

By virtue of the above integration, the apparatus according to the invention not only makes it possible to recognize the conformity of a curved object into a standard curved object, but also to act very quickly on the conditions under which these objects are formed, in the event of a systematic drift, in view of reducing the reject rate.

BRIEF DESCRIPTION OF THE DRAWINGS

The invention shall now be described with reference to the appended drawings, in which.

DETAILED DESCRIPTION OF PREFERRED EMBODIMENTS

Figure 1:
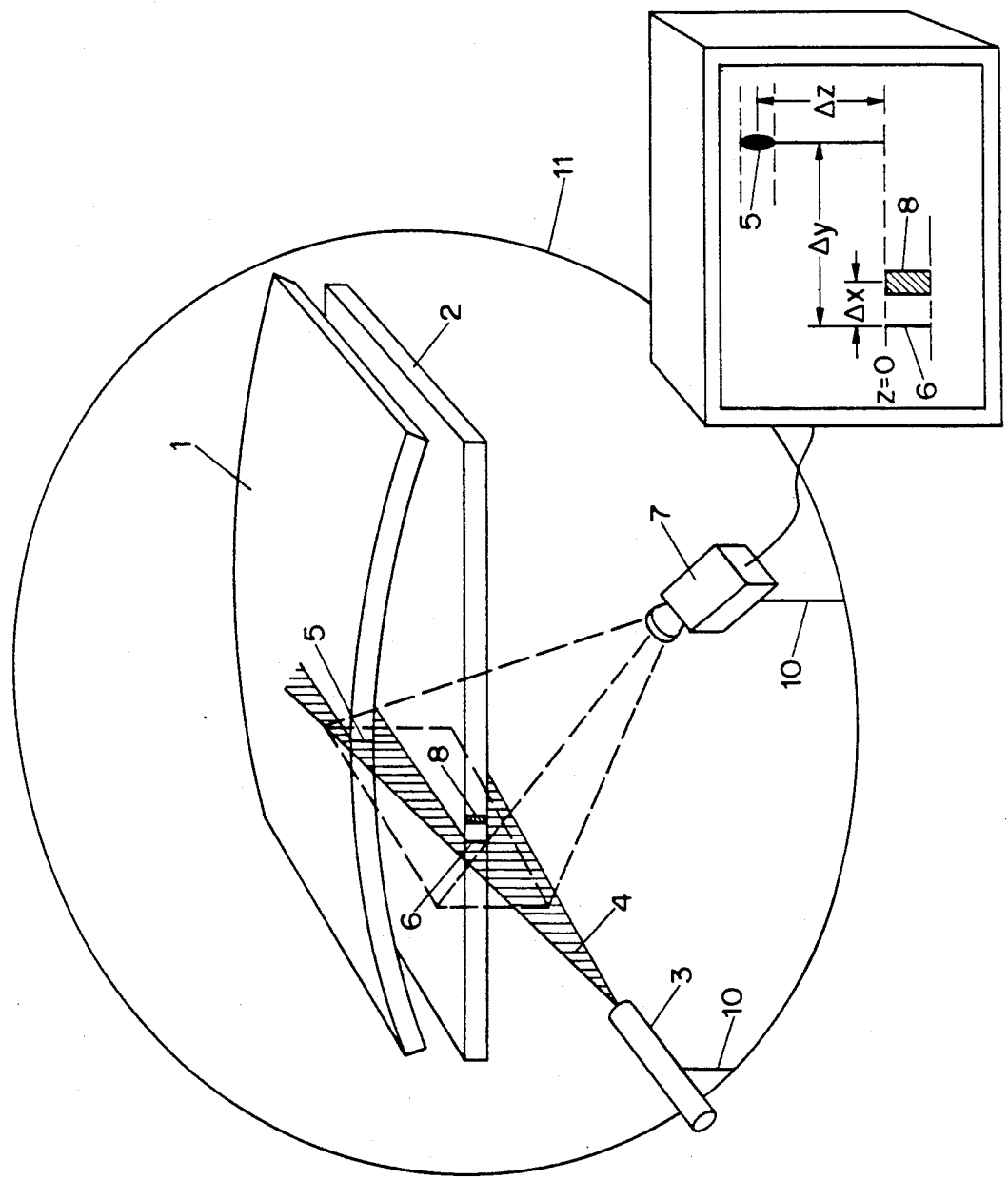
FIG. 1 shows a first variant of the process according to the invention, in which the reference is in the form of a thick plate such as a metallic plate.
Figure 2:
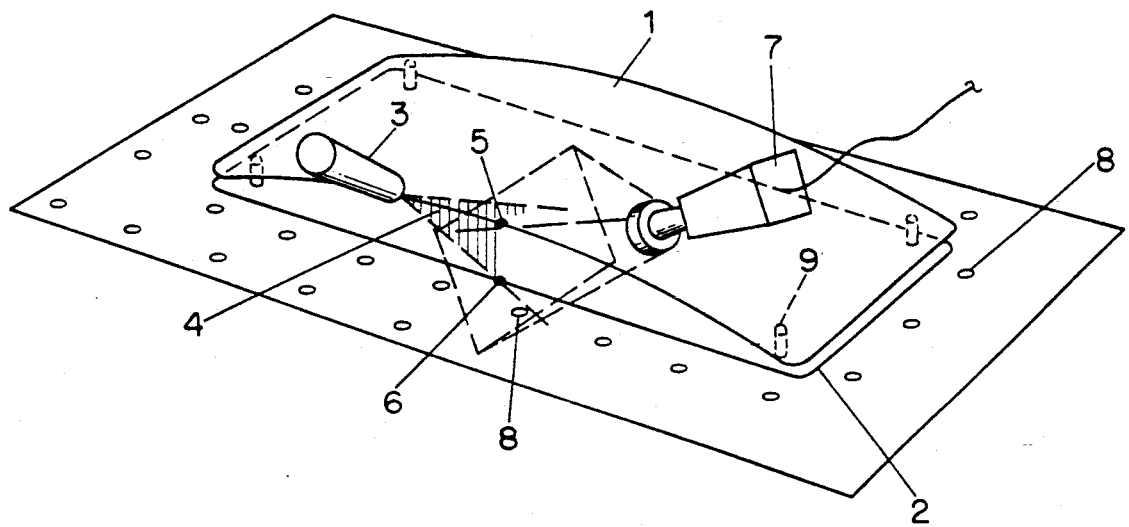
FIG. 2 shows a second variant of the process according to the invention, in which the reference is in the form of a surface, such as a photographic film.
Figure 3:
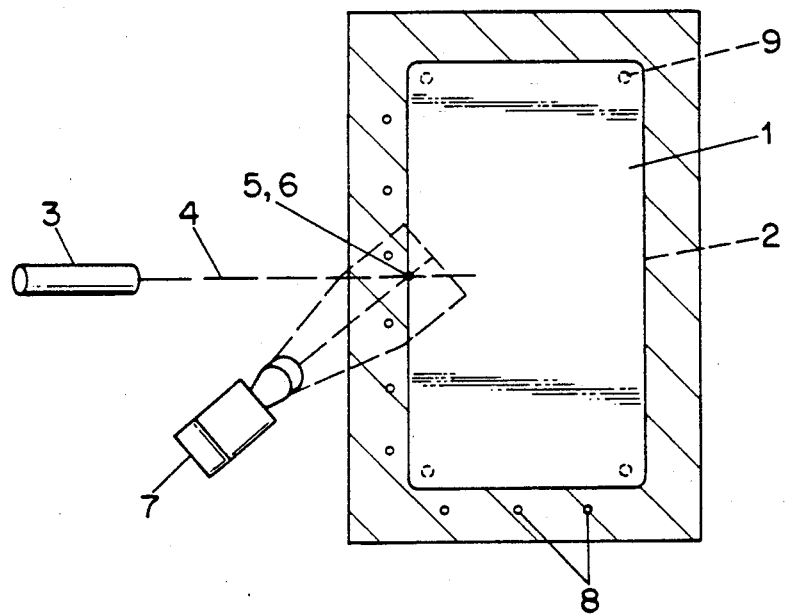
FIGS. 3 and 4 respectively show plan and side views of FIG. 2.
Figure 4:
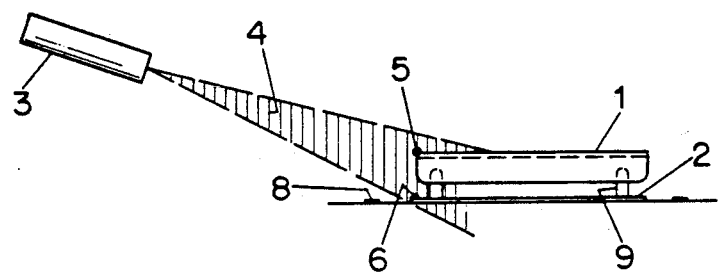
Figure 5:
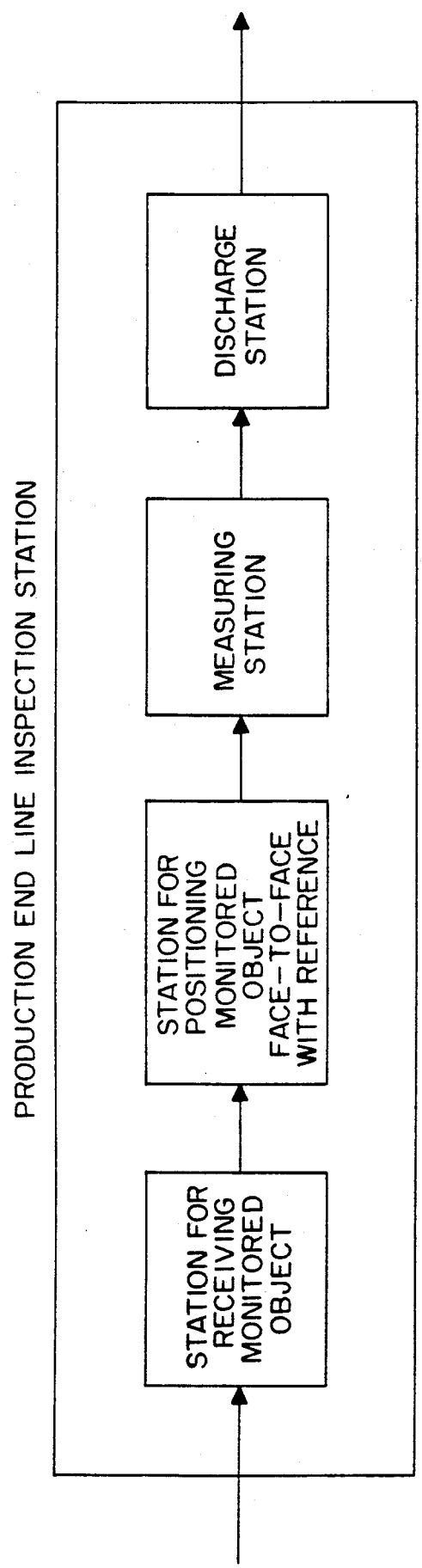
FIG. 5 shows a production end line inspection station.

In the drawings:

numeral (1) designates a monitored curved object (automobile side window);

numeral (2) designated the reference of the corresponding standard object; the reference being formed by a suitably cut out metal plate, in the case of FIG. 1, or a perimeter (red line) on a photographic film (black), in the case of FIG. 2.

numeral (3) designates a laser which emits a fan beam (4) shown in grey; the fan beam is in a plane that is perpendicular to that of the reference, metal plate, or photographic film and contains the normal of the edge of the monitored object (1).

Referring to FIG. 1, the axis of the fan beam is also perpendicular to the thickness of the metal plate. According to FIG. 2, the axis of the fan beam is inclined by approximately 20° with respect to the plane of the photographic film.

The fan beam determines a luminous trace (5) on the edge of the monitored object and a luminous trace (6) on the edge of the reference;

numeral (7) designates a camera whose focal axis subtends a predetermined angle with the plane of the fan beam. The camera serves for recording and displaying on a monitor trace (5), trace (6) and the trace of at least one guide (8) in the field of view of the camera (7).

In FIG. 1, the guide marks (8) are distributed in the thickness and on the perimeter of the reference (2).

In FIG. 2, the guide marks (8) are distributed around the perimeter (2) and consist of e.g. white marks on the black film, which can be illuminated from above.

Given the angle subtended between the focal axis of the camera (7) and the plane of the fan beam (4) generated by the laser (3), it is easy to calculate the vertical distance $\Delta y$, as shown in FIG. 1, along the plane of the reference between the trace (5) of the fan beam on the edges of the monitored object (1) and the trace (6) of the fan beam on the reference (2).

Given the angle of inclination of the laser with respect to the plane of the reference, the distance $\Delta z$ is determined, as shown in FIG. 1, along the plane of the fan beam between the center of the edges of the curved monitored object and the reference.

In the above, there was described an apparatus according to the invention for carrying out a measurement of the relative position of traces (5) and (6), this measurement being more precisely associated to a guide mark (8). As explained above, there is provided all around a number of guide marks such as (8) and the fixed assembly formed by the laser (3) and the camera (7) revolves around the object (1) and the reference (2) to perform a series of measurements.

As an illustrative example, the time taken to perform a series of measurements on a curved object (1) having a width of approximately 400 mm and a length of approximately 700 mm is about 6 seconds (or 8 seconds with handling time), with an accuracy of 0.1 mm.

The above measurements were made according to variant of the process illustrated in FIG. 2, with laser inclined by about 20° with respect to the photographic film.

FIG. 2 shows schematically four spacers (9) for supporting the monitored object (1) above the reference (2).

The spacers should be sufficiently high so that no edge of the monitored object touches the reference when in the measuring position, in order to keep well distant the traces from the fan beam on the reference and the monitored object.

As an illustrative example, there are given below a few details concerning the four work-stations of the turret described above. Each of the work-stations comprises a support that can be inclined as desired.

The support has a central hollow position to allow the passage of a suction pad, provided to join together the reference and the monitored object. The support is also provided with spacers for positioning the reference.

The reference can be snap-filled onto its support. It is also provided with a central hollow portion to allow passage of a suction pad.

The monitored object is held spaced from the reference by at least three spacers. It is held in an inclined position on two other supporting spacers and, optionally, by the centrally located suction pad.

What is claimed is:

1. Process for determining and monitoring the shape of the edges of a curved object by comparison with the shape of the edges of a standard curved object, wherein said process comprises the steps of:

forming an orthogonal projection of the standard curved object on a plane, the formed projection constituting the reference to which monitored objects will be compared and providing guide marks in a region of the reference's perimeter;

positioning said monitored object face-to-face with said reference;

illuminating the edges of said monitored object and the edges of said reference with a fan beam having an axis generated by a laser having an emission wavelength and generating trace of said beam on said edges, said fan beam being in a plane orthogonal to the plane of said reference and containing the normal of the edge of said monitored object;

recording said traces of said laser beam on the edges of said monitored object and said reference along with traces of at least one guide mark by means of a camera fixedly positioned with respect to said laser and having a focal axis subtending a known constant angle with the plane of said fan beam generated by said laser, said fixed system formed by said laser and said camera being displaced around said monitored object for performing a series of recordings;

calculating on the basis of said recording on the one hand the spacing between said monitored object and said reference in the plane of said fan beam and on the other hand the distance between the edges of said monitored object and said edges of said reference in the plane of said reference; and comparing said spacing and said distance values, after correcting for a trimming operation, with data relative to said curved object.

2. The process as claimed in claim 1, wherein said reference is inclined with respect to the horizontal and said monitored object is positioned above said reference.

3. The process as claimed in claim 1, wherein said reference comprises an object having a length, width, and thickness, said guidemarks being disposed within said thickness, and said fan beam being perpendicular to said thickness of said reference.

4. The process as claimed in claim 1, wherein said reference comprises a surface, said surface bearing said trace of said orthogonal projection and of said guide marks, and the axis of said fan beam is inclined with respect to said surface.

5. The process as claimed in claim 4, wherein said reference comprises a dark surface bearing said trace in the form of a line whose color is in the spectral region of said emission wavelength of said laser, said reference having detectable marks in proximity to said line.

6. The process as claimed in claim 5, wherein said dark surface is photographic film.

7. A process for determining and monitoring the shape of the edges of a curved object by comparison with the shape of the edges of a standard curved object as claimed in any one of claims 1 to 5, wherein said process is performed by an apparatus comprising:
   means for forming on a plane an orthogonal projections of a standard curved object, said formed projection constituting a reference, said reference having a perimeter with guide marks disposed about a region of said perimeter;
   means for fixing together said reference and a curved object to be monitored;
   means for supporting an assembly formed by said reference and said monitored object;
   means for illuminating the edges of said monitored object and the edges of said reference with a fan beam generated by a laser and generating traces of said beam on said edges, said fan beam being in a plane orthogonal to the plane of said reference and containing the normal of the edge of said monitored object;
   means for recording said traces of said laser beam on the edges of said monitored object and said reference along with traces of at least one guide mark by means of a camera fixedly positioned with respect to said laser and having a focal axis subtending a known constant angle with the plane of said fan beam generated by said laser; and
   an assembly connecting said laser and said camera, said assembly being rotatable around said assembly formed by said reference and said monitored object;
wherein said apparatus is disposed within an inspection station at the end of a production line for curved objects, said inspection station being equipped with at least a station for receiving said monitored object, a station for positioning said monitored object face-to-face with said reference, a station for carrying out said calculations and said comparisons, and a station for discharging said monitored object from the production line.

8. An apparatus for determining and monitoring the shape of the edges of a curved object by comparison with the shape of the edges of a standard curved object, wherein said apparatus comprises:
   means for forming on a plane an orthogonal projection of said standard curved object, said formed projection constituting a reference, said reference having a perimeter with guide marks disposed about a region of said perimeter;
   means for fixing together said reference and said monitored object;
   means for supporting an assembly formed by said reference and said monitored object;
   means for illuminating the edges of said monitored object and the edges of said reference with a fan beam having an axis generated by a laser and generating traces of said beam on said edges, said fan beam being in a plane orthogonal to the plane of said reference and containing the normal of the edge of said monitored object;
   means for recording said traces of said laser beam on the edges of said monitored object and said reference along with traces of at lease one guide mark by means of a camera fixedly positioned with respect to said laser and having a focal axis subtending a known constant angle with the plane of said fan beam generated by said laser; and
   an assembly connecting said laser and said camera, said assembly being rotatable around said assembly formed by said reference and said monitored object;
whereby said recordings are used to calculate the spacing between said monitored object and said reference in the plane of said fan beam and the distance between said edges of said monitored object and said edges of said reference, and said spacing and distance values are compared, after correcting during a trimming operation, with data relative to said standard curved object.

* * * * *

UNITED STATES PATENT AND TRADEMARK OFFICE
CERTIFICATE OF CORRECTION

PATENT NO. : 5,085,516

DATED : February 4, 1992

INVENTOR(S) : Bertrand et al.

It is certified that error appears in the above-identified patent and that said Letters Patent is hereby corrected as shown below:

Column 1, line 10, "curved" should read --curved object--;
        line 26, "in view" should read --in view of--;

Column 2, line 33, "Guide marks..." should start a new paragraph;

Column 3, line 11, "use," should read --use--;
        line 67, "which" should read --which are--;

Column 4, lines 27-28, "use obviously," should read --use; obviously,--;

Column 5, line 9, "designated" should read --designates--;
        line 18, following "(1)" insert -- -numerals (10) and (11) designate an assembly connecting laser (3) and camera (7) such that laser (3) and camera (7) are fixedly positioned with respect to each other and can be displaced around monitored object (1).--;
        line 66, "variant" should read --a variant--;

UNITED STATES PATENT AND TRADEMARK OFFICE
CERTIFICATE OF CORRECTION

PATENT NO. : 5,085,516

DATED : February 4, 1992

INVENTOR(S) : Bertrand et al.

It is certified that error appears in the above-identified patent and that said Letters Patent is hereby corrected as shown below:

Column 7, lines 21-22, "projections" should read --projection--;

Column 8, line 32, "lease" should read --least--.

Signed and Sealed this

Twenty-first Day of September, 1993

Attest:

BRUCE LEHMAN

Attesting Officer

Commissioner of Patents and Trademarks